(12) United States Patent
Schreurs et al.

(10) Patent No.: US 11,920,531 B2
(45) Date of Patent: Mar. 5, 2024

(54) METHOD OF DETERMINING ENGINE TORQUE

(71) Applicant: Borgwarner Luxembourg Automotive Systems S.A., Bascharage (LU)

(72) Inventors: Bart Schreurs, Waltzing (BE); Michel Peters, Luxembourg (LU)

(73) Assignee: BORGWARNER LUXEMBOURG OPERATIONS SARL, Hautcharage (LU)

( * ) Notice: Subject to any disclaimer, the term of this patent is extended or adjusted under 35 U.S.C. 154(b) by 0 days.

(21) Appl. No.: 17/999,436

(22) PCT Filed: May 21, 2021

(86) PCT No.: PCT/EP2021/063599
§ 371 (c)(1),
(2) Date: Nov. 21, 2022

(87) PCT Pub. No.: WO2021/249742
PCT Pub. Date: Dec. 16, 2021

(65) Prior Publication Data
US 2023/0287840 A1    Sep. 14, 2023

(30) Foreign Application Priority Data
Jun. 10, 2020    (GB) .................................... 2008805

(51) Int. Cl.
*F02D 41/00* (2006.01)
*G01M 15/04* (2006.01)

(52) U.S. Cl.
CPC .......... *F02D 41/009* (2013.01); *G01M 15/046* (2013.01); *F02D 2200/1004* (2013.01)

(58) Field of Classification Search
CPC .......... F02D 41/009; F02D 2200/1004; G01M 15/046

(Continued)

(56) References Cited

U.S. PATENT DOCUMENTS

| 4,898,025 A | 2/1990 | Weyland |
| 7,593,796 B2 | 9/2009 | Prokhorov |

(Continued)

FOREIGN PATENT DOCUMENTS

| DE | 10313471 A1 | 10/2004 |
| JP | H1144246 A | 2/1999 |

OTHER PUBLICATIONS

International Search Report and Written Opinion dated Aug. 11, 2021 in counterpart International Patent Application No. PCT/EP2021/063599 (12 pages, in English).

(Continued)

*Primary Examiner* — Hai H Huynh
(74) *Attorney, Agent, or Firm* — WARNER NORCROSS + JUDD, LLP

(57) ABSTRACT

A method of controlling a vehicle engine comprising estimating a value for the actual engine torque, comparing this with a further calculated (expected) torque value, and controlling the engine consequent to said comparing, the value for the actual engine torque being determined from the following steps: •a) from a crankshaft signal, providing a plot or signal indicative of instantaneous crankshaft speed; •b) differentiating said plot or signal indicative of instantaneous crankshaft speed with respect to time to determine acceleration values; •c) within a crankshaft/time interval, determining a maximum and a minimum acceleration value from step b); •d) determining the difference between said maximum and minimum acceleration values; •e) determining a torque value dependent on said difference from step d).

10 Claims, 4 Drawing Sheets

(58) Field of Classification Search
USPC .......... 123/436; 701/110; 73/114.11, 114.15, 73/114.25
See application file for complete search history.

(56) References Cited

U.S. PATENT DOCUMENTS

2014/0261317 A1  9/2014  Loucks et al.
2019/0178191 A1  6/2019  Hagari

OTHER PUBLICATIONS

Search Report in Application GBf2008805.0, dated Nov. 16, 2020 (1 page).

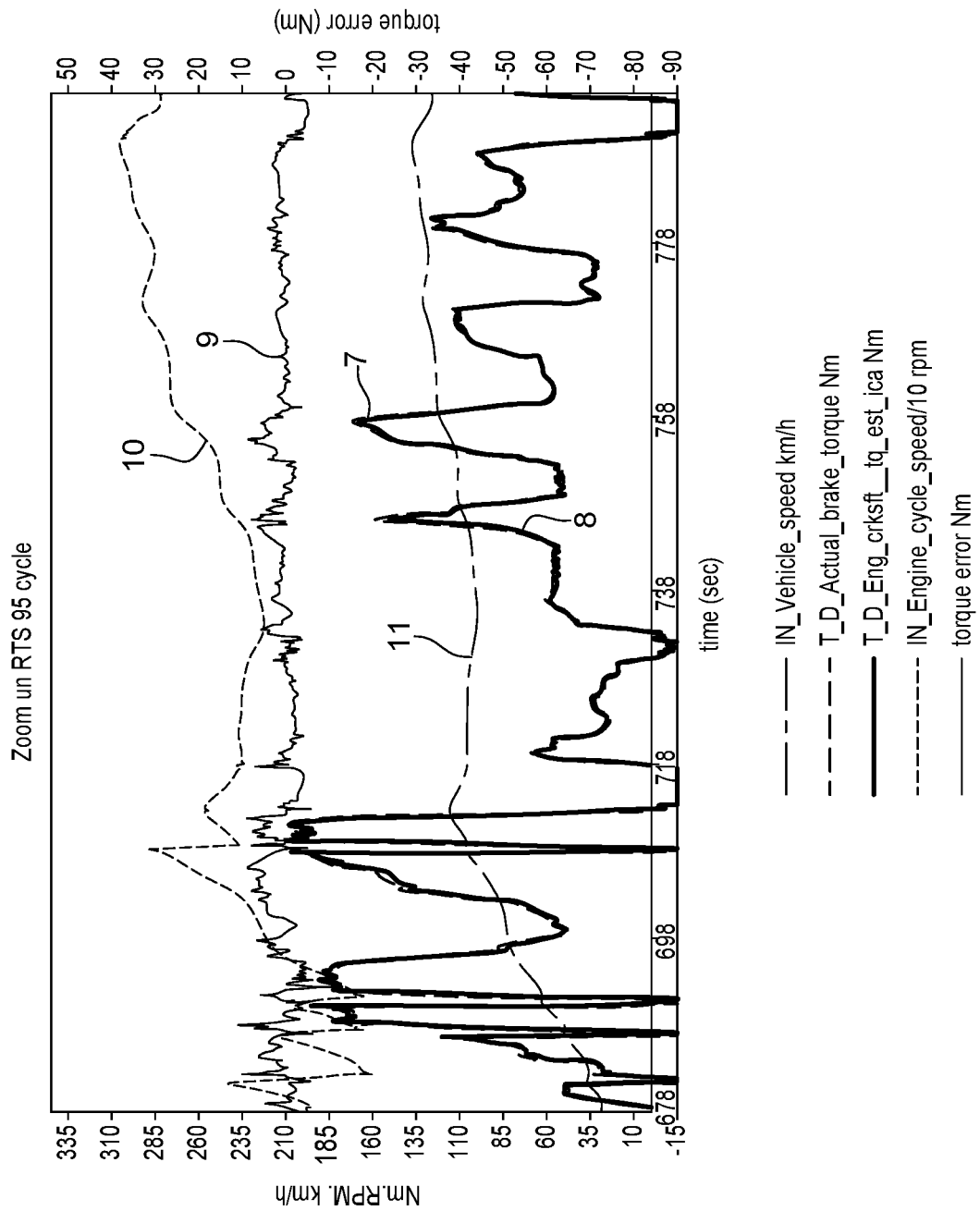

METHOD OF DETERMINING ENGINE TORQUE

CROSS-REFERENCE TO RELATED APPLICATION(S)

This patent application is a National Stage of and claims the benefit of priority to International Patent Application No. PCT/EP2021/063599, filed on May 21, 2021, which claims the benefit of priority to GB 2008805.0, filed on Jun. 10, 2020.

TECHNICAL FIELD

This relates to engine safety monitoring and has particular application to a method of monitoring actual torque with expected torque.

BACKGROUND OF THE INVENTION

Engine Safety Monitoring (ESM) is a mandatory safety requirement for avoiding unwanted or driver unintended acceleration or deceleration in vehicles that would lead to unsafe driving conditions. There are basically two types of such monitoring: vehicle acceleration monitoring, and continuous engine torque monitoring.

The vehicle acceleration monitoring compares the real acceleration of the car with mapped thresholds based on the driver's pedal position and torque demand. If the expected car's acceleration is too far away from the real acceleration (e.g. car accelerates faster than would be possible with the torque demand from the driver) the safety monitoring system recognizes this and takes action to reduce the torque such as e.g. cutting the fuel to the cylinders.

Continuous torque monitoring compares the main ECU calculated torque value (expected value) with a second/safety calculated ("actual") torque value. The second calculated torque value is calculated based on a somewhat simplified model that uses different table lookups and some different input variables. This calculation needs to take a different path and must use different ROM and RAM locations such that the output can be used as a redundant value that can be used in a safety monitoring concept.

So in the continuous torque monitoring concept, there are two variables or values calculated that represent the engine torque; and they are calculated in different ways. One could be regarded as an expected torque estimate based on demand parameters and the second can be regarded as a measured or computed "actual" torque. These two torque values are constantly compared to each other and if the difference between the two deviates more than a calibratable threshold, the safety monitor will take action and can decide to reduce the output torque of the engine or in the worst case to let the engine stall by turning off the injector drives.

So in other words an expected engine torque is compared with an actual engine torque. The expected engine torque is determined from e.g. demand parameters and the actual torque is determined/estimated in a different way.

The Original Engine Manufacturer (OEM) can choose for one of the above ESM concepts or may use a combination of the two concepts.

The problem with the continuous torque monitoring is the amount of calibration work required and potentially the ECU processing required for calculating a second (redundant) "actual" torque value It is an object of the invention to provide an alternative improved method for calculating the (second) "actual" torque estimate; which is e.g. compared with a torque value determined or based on demand inputs; so it is used for continuous torque monitoring.

SUMMARY OF THE INVENTION

In one aspect is provided a method of controlling a vehicle engine comprising estimating a value for the actual engine torque, comparing this with a further calculated (expected) torque value, and controlling the engine consequent to said comparing, the value for the actual engine torque being determined from the following steps:
  a) from a crankshaft signal, providing a plot or signal indicative of instantaneous crankshaft speed;
  b) differentiating said plot or signal indicative of instantaneous crankshaft speed with respect to time to determine acceleration values;
  c) within a crankshaft/time interval, determining a maximum and a minimum acceleration value from step b);
  d) determining the difference between said maximum and minimum acceleration values;
  e) determining a torque value dependent on said difference from step d).

Step b) may comprises:
  i) in said crankshaft/time interval, determining a set of values of acceleration from the minima and maxima values of a crankshaft speed signal/plot.

Said set of values may be determined from the maxima and subsequent minima of said plot and from the minima and subsequent maxima.

The values of accelerations may be determined from the following formulae $$acc = (\text{speed Max}(n) - \text{speed Min}(n))/t_{int}$$

where speed Max(n) is the speed maxima following the combustion event n; speed Min(n) is the speed minima prior to the combustion event n; and $t_{int}$ is the time between the maxima and the preceding minima;
and/or $$acc = (\text{speed Min}(n+1) - \text{speed Max}(n))/t_{int}$$

where speed Max(n) is the speed maxima following a combustion event n; here speed Min(n+1) is the speed minima immediately after the combustion event n;
and $t_{int}$ is the time between the minima or maxima and the preceding maxima or minima respectively.

The method may comprise determining the torque from said difference from a stored look up table of MAP correlating said differences to torques.

Step e) may be dependent on engine gear.

A method may be such that if said computed actual engine torque value differs from said second torque values by more than a threshold, the output torque of the engine is reduced or the engine is disabled.

Said minimum acceleration values is the negative acceleration values with the highest magnitude.

BRIEF DESCRIPTION OF THE DRAWINGS

The present invention is now described by way of example with reference to the accompanying drawings in which.

FIG. 4 illustrates the results of the invention.

DESCRIPTION OF THE PREFERRED EMBODIMENTS

In examples, the "second" i. e. actual engine torque that is e.g. used for safety monitoring, (that is the estimated actual torque developed by the engine) is calculated or determined by a new methodology. This value may then subsequently be compared with a "first" e.g. expected torque value determined or based e.g. on demand parameters for safety monitoring or subsequently engine control.

The instantaneous crankshaft accelerations that are present in a running internal combustion engine (e.g. 2- or 4-stroke engines with one or multiple cylinders) are the result of the cyclic forces applied by the piston on the crankshaft via the connecting rods. The difference or delta between the maximum instantaneous acceleration and the minimum instantaneous acceleration seen in an engine cycle e.g. during the power-stroke and the compression stroke of the engine is proportional to the torque delivered by the engine.

In example methodology use is made of this to determine a second/"actual" torque value.

Generally speaking the following method steps are provided:

A) Firstly a crankshaft signal, is provided, providing a plot or signal indicative of (e.g. instantaneous) crankshaft speed;

B) Next, the plot or signal indicative of instantaneous crankshaft speed is differentiated with respect to time to determine acceleration values;

C) In an appropriate crankshaft/time interval, maximum and minimum acceleration values are determined/selected from the results of B);

D) In the next step, the difference between said maxima and minima (in said crankshaft angular interval) is determined;

E) In the final step, determining estimated (actual) torque value is found dependent on said difference from step D)

Step E may be provided by correlating said difference with torque values. The correlation may be engine type dependent and may be done using stored correlations MAPs or tables. The correlation may change depending on the gear the vehicle is running in.

Figure 1:
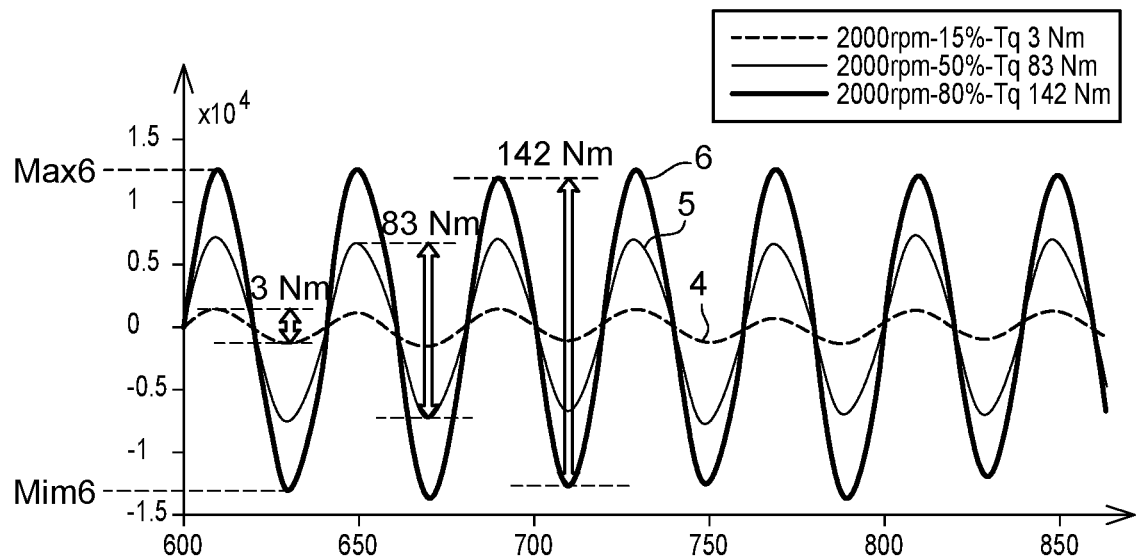
FIG. 1 shows three plots of crankshaft acceleration for three different engine output torques.

FIG. 1 shows three plots 4, 5, 6 of (instantaneous) acceleration i.e. the instantaneous crankshaft acceleration for three different engine output torques 3 Nm, 83 Nm, 142 Nm respectively, against time (or crank angle). This is recorded at 2000 RPM. This may be obtained by differentiation of a crankshaft speed signal. Assuming that the instantaneous speed signal is sinusoidal, the calculated acceleration values will also be sinusoidal when plotted on a graph. Indeed, the derivative of a sine signal (speed) with respect to time is a cosine (acceleration) which is in fact a 90 degrees shifted sine.

Regarding step D), as can be seen from FIG. 1, the acceleration gives a sinusoidal plot and there is a correlation between the torque provided and the difference between the maximum and minimum accelerations. So for plot 6 the max acceleration is Max 6 and minimum instantaneous acceleration is Min 6. The difference (delta) between these two values is proportional to the torque.

So regarding step E) using e.g. a calibration table (look-up table/MAP) the delta acceleration can be used to determine torque.

Figure 2:
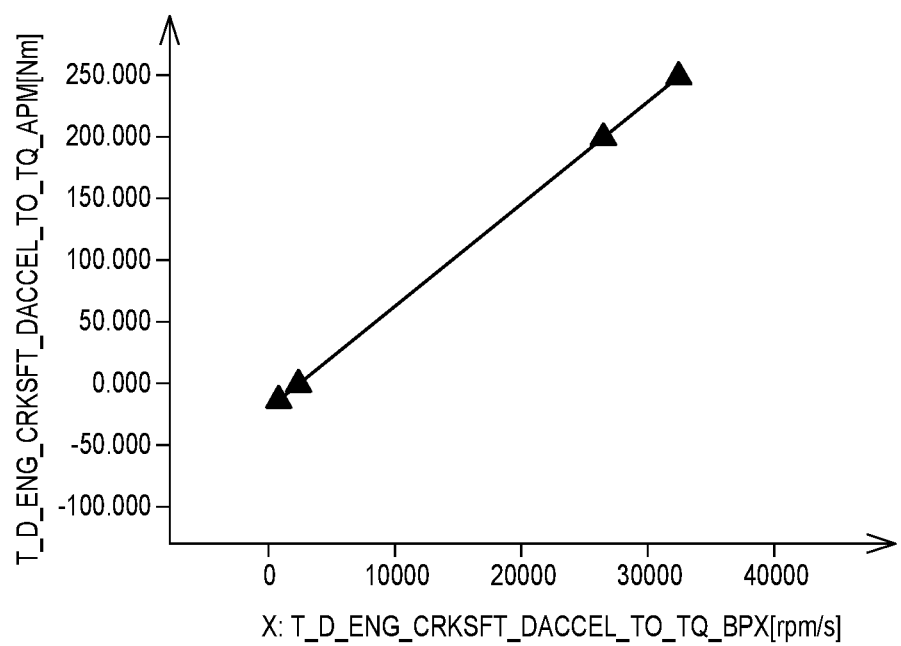
FIG. 2 shows a chart of engine torque against delta acceleration.

FIG. 2 shows a chart of delta acceleration against torque. Delta acceleration is defined as the difference (in a suitable time/crankshaft angular interval) between the maximum acceleration and the minimum acceleration (the highest negative acceleration (deceleration) i For every engine family it is easy to calibrate the factor that converts the delta of the max and min instantaneous crankshaft acceleration (rpm/s) into torque (Nm). In the example of the calibration used in a GDI 3 cylinder 1.0l turbocharged engine, the factor can be looked up in a table with as input the delta between the maximum and minimum instantaneous crankshaft acceleration expressed in rpm/s and the output gives the brake torque expressed in Nm.

As there are typically 60–2 teeth (i.e. 58 teeth) on a crankshaft encoder, an acceleration value can be determined as described above on every tooth, as will be described below.

The instantaneous acceleration values may be determined and the maximum and minimum values in an appropriate interval may be selected and the difference therebetween may be used to determine the torque.

Now, rather than calculating the acceleration value on every tooth, it is only calculated on the two teeth which give the maximum acceleration and the minimum acceleration values for every cylinder: these teeth may be determined offline from the instantaneous speed. For a n-cylinder engine, the ECU calculates thus only n*2 acceleration values per engine cycle (i.e. per two crankshaft revolutions for a 4-stroke engine). The minimum and maximum acceleration values of each cylinder can then be used to determine the delta.

Example of Step B: Determining Instantaneous Crankshaft Acceleration.

One method of implementing step B will now be described in more detail

Figure 3A:
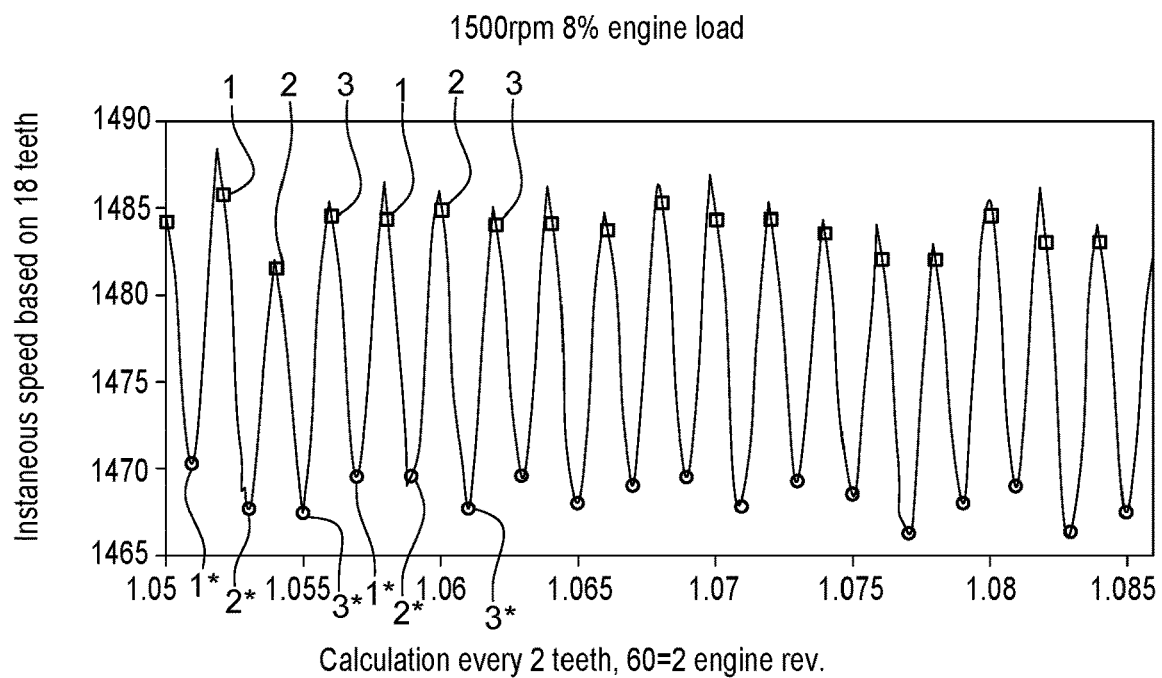
FIG. 3a shows a plot of the instantaneous engine speed for 3-cylinder engine (determined form the crankshaft signal) against crankshaft position.

FIG. 3a shows a plot of the instantaneous engine speed for a 3-cylinder engine (determined form the crankshaft signal) against crankshaft position E. So the X axis is the crankshaft position, incremented by 1 every second tooth so 60=2 engine revolutions.

The plot oscillates from low values (minima) to high values (maxima) consequent to combustion/firing events. The plot shows a 3-cylinder engine with the cylinders #1 #2 and #3 firing consecutively. Points 1*, 2*, 3* show the minima of speed prior to firing/combustion events in cylinders #1, #2, #3 respectively and points 1, 2, 3 show the maxima of speed consequent/subsequent to firing in cylinders #1, #2, and #3 respectively.

Figure 3B:
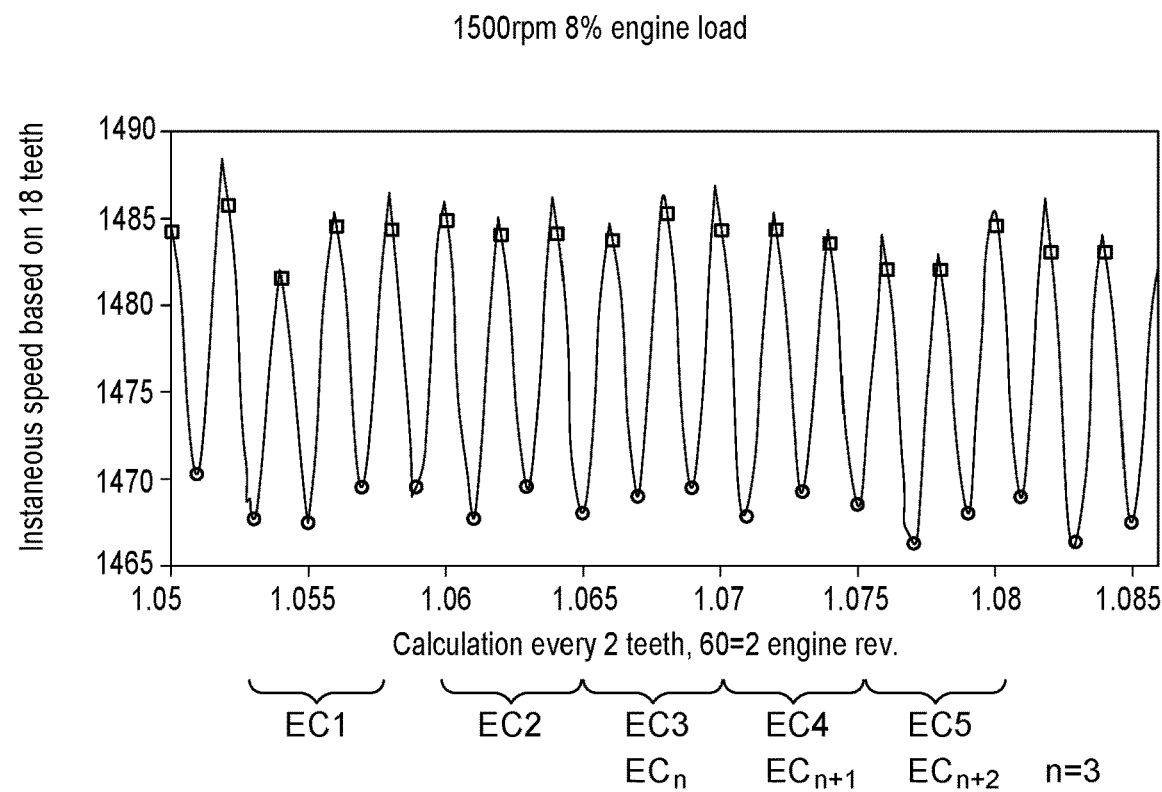
FIG. 3b shows the identical plot to FIG. 1a but with additional notations for clarity.

FIG. 3b shows the identical plot to FIG. 3a but with additional notations for clarity. In the figure are shows a number of engine cycles, EC1, EC2, EC3, EC4, etc. In each engine cycle, there are three firings each in respect of the three cylinders respectively, generally designated ECn.

Figure 3C:
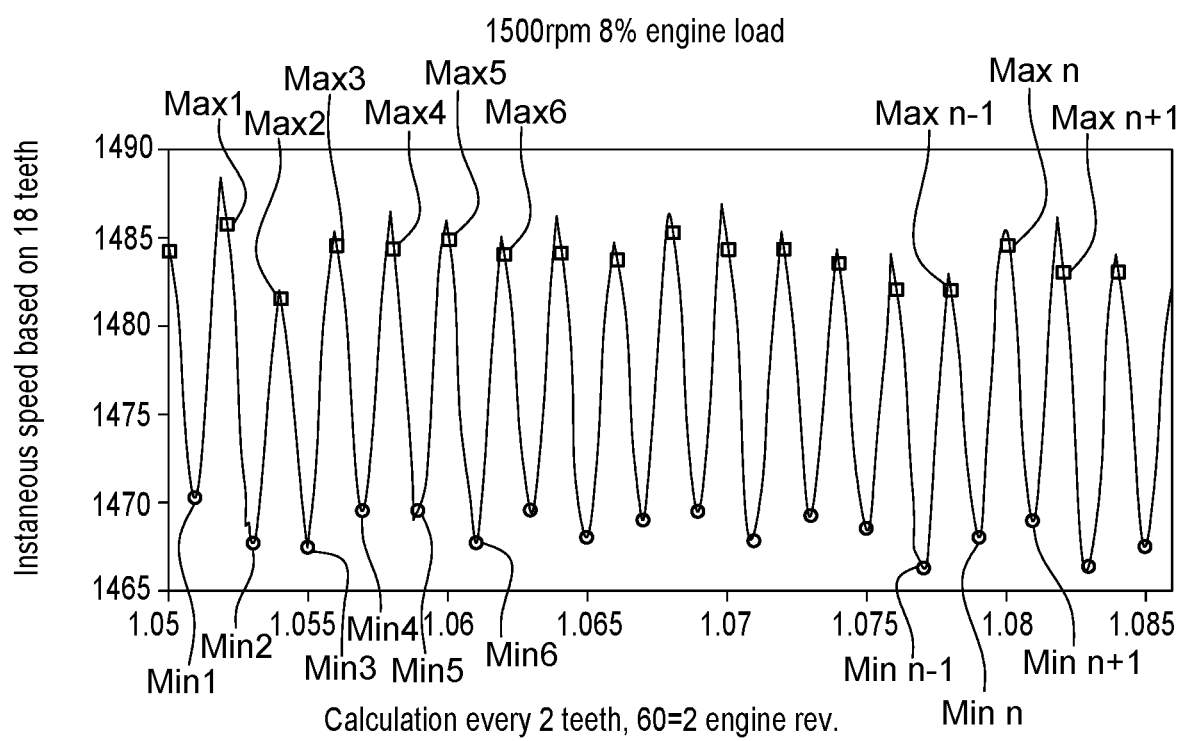
FIG. 3c shows the identical plot to FIG. 1a but with additional notations.

FIG. 3c shows the identical plot to FIG. 3a but with additional notations for clarity to describe this method. The plot can also be regarded as showing minima and maxima with respect to successive combustion events/firings #1, #2, #3, #4, #5, etc., generally designated #n where n is a monotonically increasing integer. So the plot shows Min1 and Max 1 for in respect of minima and maxima immediately prior and subsequent to combustion event #1; Min 2 and Max 2 in respect of minima and maxima immediately prior and subsequent to combustion event #2, etc. So with respect to each or a particular cylinder/firing event, the plot shows subsequent to firing of a cylinder/ignition, at each combustion event, the speed goes from a minima to a maxima.

The minima and maxima in examples are used to determine the instantaneous acceleration with respect to a particular firing/combustion event in an engine cycle event i.e. for a particular cylinder.

The formula used for determining the (positive) acceleration calculation with respect to a combustion event numbered #n is:

$$acc = (\text{speed Max}(n) - \text{speed Min}(n))/t_{int}$$

where speed Max(n) is the speed maxima following the combustion event n;
here speed Min(n) is the speed minima prior to the combustion event n;
and $t_{int}$ is the time between the maxima and the preceding minima.

The formula for determining the (de-)acceleration calculation with subsequent to a combustion event numbered #n is:

$$acc = (\text{speed Min}(n+1) - \text{speed Max}(n))/t_{int}$$

where speed Max(n) is the speed maxima following a combustion event n;
here speed Min (n+1) is the speed minima immediately after the combustion event n (after Max(n));
and $t_{int}$ is the time between the minima and the preceding maxima.

Other formulae may be used such as those in the Applicants co-pending UK applications GB 13.7 and GB 1915408.7

In other words, the positive acceleration is determined as the change in speed per time, the change in speed being the speed maximum minus the previous speed minimum (e.g. with respect to the combustion event) and the negative acceleration is determined as the change of speed per time; the change in speed being the speed minimum minus the preceding maximum value. In a time/crankshaft angular interval, the highest values of these determined acceleration are selected; i.e highest positive acceleration and the most negative acceleration. The difference between these two (delta) is used to determine torque.

To recap, the plot is marked with minima "Min1" and maxima (Max 1) for combustion event #1, minima "Min2" maxima "Max2" for combustion event #; minima "Min3" and maxima "Max3" for combustion event #3; minima "Min4" maxima "Max4" for combustion event #4, etc.. The combustion event can be regarded as combustion event "n" comprising adjacent contiguous combustion events—preceding combustion event n−1, and subsequent combustion event n+1. The formula can be used for any number of cylinders.

So in a suitable time or rather crankshaft interval, a set of contiguous values of acceleration and deceleration is determined. These are determined from the difference in magnitude between maxima and subsequent minima, or minima and subsequent maxima. In an interval, the highest positive and negative values are selected and the delta determined therefrom.

In the example of FIG. 3c the values would be
Max1−Min1/$t_{int}$,  Min2−Max1/$t_{int}$,  Max2−Min2/$t_{int}$, Min3−Max2/$t_{int}$, etc Other To get the best possible precision it is advantageous to use a separate calibration for each gear since the gearbox and subsequent driveshafts can have a little effect on the delta accelerations measured for a given torque output of the engine. But this effect is fairly small and can be neglected in most cases.

The problem of heavy calibration workload and high micro-processor load and high ROM/RAM usage is solved by methodology according to examples. Thus examples of the invention provide an alternative calculation method for determining the actual torque (for the continuous torque monitoring. The calibration effort to obtain a torque variable with acceptable precision that can be used in the safety monitoring system is very small compared to the prior art methods.

FIG. 4, (an extract from an RTS 95 emission cycle) illustrates the results of the invention, two torque variables can be seen: Plot 7 shows="standard" main torque demand (expected torque) variable used in the engine control software plot 8 shows the actual estimated torque based on the instantaneous crankshaft accelerations according to aspects of the invention; plot 9 shows error or difference between the above torque values; plot 10 shows the engine RPM and plot 11 shows vehicle speed.

In this graph it is quite easy to appreciate how the two independent torque variables track each other fairly well, and it can be assumed that the proposed alternative torque calculation method will be a good candidate for the continuous torque monitoring safety concept.

In the prior art, the actual torque variable that is used to do the comparison with the estimated torque variable (i.e. main modelled torque variable that is used in the engine control software) is calculated in a separate software module with a somewhat simplified model. This simplified model requires still a lot of calibration work. This extra simplified model is using typically as a base a "speed density" based airflow which is corrected for different cam-phaser positions and this airflow is further converted into a brake torque. This brake torque must be further corrected for engine and ambient temperatures, etc (more or less friction . . . ). And since none of the corrections applied for the calculation of "standard" torque variable can be reused for this "safety" torque variable a whole extra set of lookup tables and correction factors are required.

In contrast, the advantages provided by aspects of the invention are very low calibration effort and time; good precision of the new estimated torque value. It can be used with the misfire diagnostic function and requires very little extra microprocessor throughput and ROM/RAM usage. In order to determine the instantaneous crankshaft accelerations known methods may be used, such as those in co-pending applications. These method will now be detailed for the sake of completeness.

The invention claimed is:
1. A method of controlling a vehicle engine comprising estimating a value for the actual engine torque, comparing this with a further calculated (expected) torque value, and controlling the engine consequent to said comparing, the value for the actual engine torque being determined from the following steps:
   a) from a crankshaft signal, providing a plot or signal indicative of instantaneous crankshaft speed;
   b) differentiating said plot or signal indicative of instantaneous crankshaft speed with respect to time to determine acceleration values;

c) within a crankshaft/time interval, determining a maximum and a minimum acceleration value from step b);
d) determining the difference between said maximum and minimum acceleration values;
e) determining a torque value dependent on said difference from step d).

2. A method as claimed in claim 1 wherein step b) comprises: i) in said crankshaft/time interval, determining a set of values of acceleration from the minima and maxima values of a crankshaft speed signal/plot.

3. A method as claimed in claim 2 wherein said set of values is determined from the maxima and subsequent minima of said plot and from the minima and subsequent maxima.

4. A method as claimed in claim 3 wherein the values of accelerations are determined from the following formulae $$ace=(\text{speed Max}(n)-\text{speed Min}(n))/t_{int}$$

where speed Max(n) is the speed maxima following the combustion event n; speed Min(n) is the speed minima prior to the combustion event n; and $t_{int}$ is the time between the maxima and the preceding minima;
and/or $$ace=(\text{speed Min}(n+1))-\text{speed Max}(n))/t_{int}$$

where speed Max(n) is the speed maxima following a combustion event n; here speed Min(n+1) is the speed minima immediately after the combustion event n; and $t_{int}$ is the time between the minima or maxima and the preceding maxima or minima respectively.

5. A method as claimed in claim 1 comprises determining the torque from said difference from a stored look up table of MAP correlating said differences to torques.

6. A method as claimed in claim 1 wherein step e) is dependent on engine gear.

7. A method as claimed in claim 1 wherein if said computed actual engine torque value differs from said second torque values by more than a 20 threshold, the output torque of the engine is reduced or the engine is disabled.

8. A method as claimed in claim 1 wherein said minimum acceleration values is the negative acceleration values with the highest magnitude.

9. A processor configured to execute stored instructions to perform operations including:
estimating a value for an actual engine torque;
comparing the estimated value with a further calculated (expected) torque value;
controlling an engine consequent to said comparing, the value for the actual engine torque being determined from the following steps:
a) from a crankshaft signal, providing a plot or signal indicative of instantaneous crankshaft speed;
b) differentiating said plot or signal indicative of instantaneous crankshaft speed with respect to time to determine acceleration values;
c) within a crankshaft/time interval, determining a maximum and a minimum acceleration value from step b); and
d) determining the difference between said maximum and minimum acceleration values;
e) determining a torque value dependent on said difference from step d).

10. A non-transitory computer readable medium storing instructions that, when executed by at least one processor, perform operations including:
estimating a value for an actual engine torque;
comparing the estimated value with a further calculated (expected) torque value;
controlling an engine consequent to said comparing, the value for the actual engine torque being determined from the following steps:
a) from a crankshaft signal, providing a plot or signal indicative of instantaneous crankshaft speed;
b) differentiating said plot or signal indicative of instantaneous crankshaft speed with respect to time to determine acceleration values;
c) within a crankshaft/time interval, determining a maximum and a minimum acceleration value from step b); and
d) determining the difference between said maximum and minimum acceleration values.

* * * * *